`United States Patent Office`

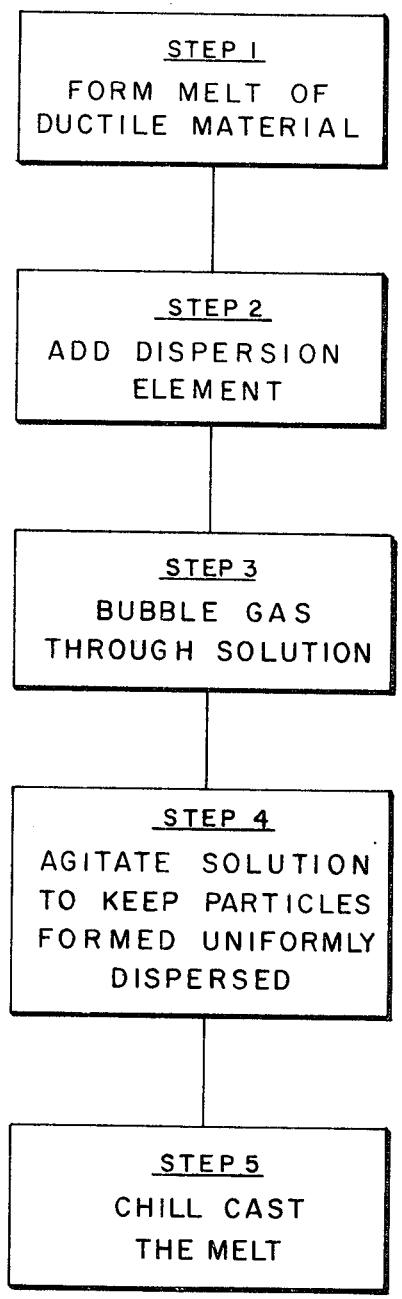

3,515,542
Patented June 2, 1970

3,515,542
**METHOD OF MAKING DISPERSION-STRENGTH-
ENED DUCTILE MATERIALS**
Earl I. Larsen, Indianapolis, Ind., assignor to P. R. Mallory & Co., Inc., Indianapolis, Ind., a corporation of Delaware
Filed Jan. 27, 1967, Ser. No. 616,751
Int. Cl. C22c 1/00
U.S. Cl. 75—122.5          10 Claims

ABSTRACT OF THE DISCLOSURE

An element that is soluble in a melt of ductile material is added to such melt and a gas is then bubbled through the resulting solution to form a compound of the element which is insoluble in the ductile material.

---

Certain pure metals such as pure copper have certain valuable properties which make them attractive for many engineering applications. The properties of major significance with respect to copper are electrical conductivity, thermal conductivity, resistance to corrosion, etc. However, in many applications it would be highly desirable to improve its basic mechanical properties such as hardness, yield strength, resistance to creep and other strength properties. For example, it would be highly desirable to provide a wrought copper composition having improved resistance to creep, improved yield strength, and improved high temperature stability with substantial high electrical conductivity, particularly in the production of articles of manufacture adapted for use as electrically conductive elements, e.g. electrical structural elements such as bus bars in the form of rods and tubing, electrical contacts, and other structures common in the electrical industry.

To this end industry, particularly the metallurgical industry, has been vigorously carrying out development work on the dispersion strengthening or hardening of copper. One of the approaches taken utilizes powder metallurgy techniques whereby small particles (usually of micron size) of a compound such as a metal oxide are mixed with copper powder after which the mixture is compacted, sintered, and subsequently hot or cold worked. Another method involves the addition of compounds or fine particles of elements which are not soluble in copper to a molten bath of copper keeping such particles in suspension in the molten copper, then chill casting the mixture to attempt to keep the particles uniformly dispersed in the copper billet or ingot.

Both of these methods have inherent disadvantages. The powder metallurgy method is costly, and it is difficult to obtain a uniform distribution of the dispersoid (stable oxide or compound) throughout the copper matrix. Hence, the properties of the end product are not uniform. With the second method, in attempting to introduce fine particles of compounds such as metal oxides into a molten copper bath, many difficulties are encountered such as: non-homogeneity of the mixture, agglomeration of the compound particles into spongy masses, and segregation into grain boundaries.

The present invention is concerned with an entirely different method of fabricating copper base materials to improve their mechanical and physical properties. Utilizing this invention, a material may be produced which is strengthened entirely by dispersion of a compound within a copper matrix or by a combination of dispersion and precipitation hardening within a copper matrix.

While the invention will be described with particular reference to the strengthening of copper based materials, it should be understood that the invention need not be so limited, and that the principles of the invention are equally adaptable to other ductile metals and particularly precious metals such as gold, silver, platinum and palladium.

Accordingly, it is an object of the present invention to provide a method of precipitation strengthening a dunctile based material.

Another object of the invention is to provide a method which will result in improved ductile materials having high mechanical properties.

Another object of the invention is to provide a method of dispersion strengthening ductile materials wherein at least one metallic element is added to such ductile material to form a dispersion strength hardened alloy, the element being soluble in a bath of the ductile element, but which is capable of forming a stable compound that is not soluble in the base material in either the molten or solid state.

Another object of the invention is to provide a method of dispersion strengthening of ductile materials wherein at least one metallic element which forms stable oxides, nitrides or hydrides is added to such ductile material to form a dispersion hardened alloy.

Another object of the invention is to provide a method of yielding a combination of precipitation and dispersion strengthening of such material.

A more particular object of the invention is to provide a method of dispersion strengthening of a copper based material.

Still another object of the invention is to provide a method which will result in a copper alloy having high mechanical properties with little reduction in electrical and thermal properties.

Yet another object of the invention is to provide a method which will result in a uniform distribution of the dispersoid throughout the copper matrix.

Yet still another object of the invention is to provide a method of dispersion strengthening of copper based material wherein at least one element taken from the class consisting of aluminum, chromium, titanium, thorium, uranium, boron, zirconium, and silicon is added to the copper matrix and subsequently treated to form a dispersion strengthened material.

With the above and other objects in view, which will appear as the description proceeds, this invention resides in a novel process for dispersion strengthening of ductile based materials substantially as described herein and more particularly defined by the appended claims, it being understood that such changes in the precise embodiment of the invention here disclosed may be made as come within the scope of the claims.

Generally speaking, the objects of the invention are accomplished by providing a method of dispersion strengthening of ductile materials which in its broadest aspect comprises forming a melt of such material, adding up to about 10 percent by weight of such melt at least one element which is soluble in such melt to form a solution of said element and said ductile material, said element being further characterized by being insoluble in such melt upon the formation of a stable oxide, hydride or nitride of such element, bubbling a gas through such solution to form a compound taken from the class consisting of such oxide, hydride or nitride of such element so as to precipitate particles of such compound throughout said melt, regulating the temperature of said melt, and the velocity and volume of such gas to control the size of said particles, agitating said melt as said gas is bubbled through said melt so as to maintain a uniform distribution of said particles throughout the melt, and chill casting said melt with said uniformly distributed particles to form a dispersion strengthened alloy of said ductile material and said compound of said element.

More particularly, the invention provides a method of dispersion strengthening which comprises forming a melt of ductile material taken from the class consisting of copper, silver, gold, platinum and palladium adding up to about 10 percent by weight of the melt at least one element taken from the class consisting of aluminum, chromium, titanium, thorium, uranium, boron, zirconium and silicon to form a solution of copper and such element, bubbling a gas taken from the class consisting of nitrogen and hydrogen and ammonia through such solution to form a compound taken from the class consisting of oxides, hydrides, and nitrides of such element and to precipitate particles of such compound throughout said melt, regulating the temperature of said melt, and the volume and velocity of such gas so as to control the size of the precipitated particles, agitating said melt as said gas is bubbled through said melt so as to maintain a uniform distribution of said particles throughout said melt, and thereafter chill casting said melt to form an alloy of said copper and said compound of said element. Preferably a "wet" gas such as wet hydrogen and ammonia are used in forming an oxide of the element added to the melt.

As an alternate form of the invention, a combination of precipitation and dispersion strengthening is achieved by allowing a portion of the element added to the melt to remain in solution in the molten ductile material.

In the accompanying drawing the sole figure is a flow sheet showing the various steps in carrying out the method of the invention.

In practicing the invention certain general criticalities must be met in order to achieve a sound dispersion strengthened alloy. First of all the amount of element added to the melt should not be excessive. An excessive amount adversely affects the properties of the base material. For example, in forming a copper based alloy a loss of electrical conductivity would result. The amount of element that can be added should be limited to approximately 10 percent by weight of the melt. Optimum percentages are dependent upon the alloy being formed. Such percentages will be illustrated in the examples hereinafter described.

Of particular importance is the critical distribution of the precipitated particles in the melt. The particles must be kept uniformly distributed within the melt until the molten mixture can be chill cast. This is important as a critical distribution of the dispersoid within the grains of the solid base material is necessary to block slip planes within the crystal lattice and thus yield, in the case of a copper based alloy for example, an improved copper mixture with high mechanical properties with little reduction in electrical and thermal conductivities. The critical, uniform distribution can be achieved in various ways; for example stirring the melt or by shaking the melt through vibration.

It is also necessary to control the particle size of the dispersoid within the melt. Such control is necessary to further insure a uniform distribution of the particles and to enhance the dispersoid as a strengthening agent. In the practice of the invention, such control of the particles size is achieved by regulating the temperature of the melt, and the volume and velocity of the gas being bubbled through the melt. Thus increasing the temperature of melt causes the particles size to coalesce and agglomerate, while increasing the volume and velocity of the gas causes the particle size of the dispersoid to grow too large to be an effective dispersion strengthening agent. Optimum conditions will depend upon the materials of the alloy, and the particle size of the dispersoid desired.

While there may be a number of variations in practicing the invention, the following examples will serve to further describe the basic concept. As previously noted, the description will be centered about the formation of copper based alloys, it being understood that the invention need not be so limited.

Referring to the drawing, the first step is that of making a melt of copper. The melt may be contained in any suitable receptacle such as graphite or molybdenum, for example. To this melt there is added in step two an amount of titanium equal to about 3 percent of the weight of the copper. The titanium may be added as pure titanium or as a titanium-copper master alloy. After the titanium is in solution in the molten copper, dry nitrogen gas is bubbled through the melt. This is done by inserting a quartz tube to the bottom of the copper-titanium melt so that the nitrogen gas rises from the bottom to the top. Such gas reacts with the titanium atoms in solution in the molten copper to form titanium nitride. Since titanium nitride is not soluble in molten copper, it will precipitate out in the form of small discrete particles.

As indicated in the next step, as the discrete particles are formed, they are maintained uniformly dispersed throughout the melt. This is accomplished by agitating the melt by directly stirring the melt or shaking the melt through a suitable vibrator.

The quantity of titanium nitride that will be generated in the melt will depend upon the volume of nitrogen bubbled through the molten bath. If desired the entire quantity of titanium can be caused to react with the nitrogen gas and be precipitated in the copper melt as titanium nitride. As previously noted, the particle size can be regulated by the temperature of the melt, and the volume and velocity of gas. For the present mixture a particle size of less than about one tenth micron would be preferred for optimum dispersion strengthening.

As indicated in the final step in the drawing, the molten copper with the precipitated particles of titanium niride are chill cast to yield an improved copper alloy with high mechanical properties and with little reduction in electrical and thermal conductivities. Such chill casting can readily be accomplished by inserting the entire receptacle with the molten mixture in water, for example. Another method would be to cast the copper-titanium nitride mixture in a water cooled copper mold.

As another example of dispersion strengthening of copper, a melt of copper is first formed to which is added up to about 5% of aluminum by weight of the copper melt. Wet hydrogen or nitrogen gas is then bubbled through the resulting solution to precipitate out particles of aluminum oxide. The melt is then chill cast to form a copper-aluminum oxide dispersion strengthened alloy.

An example of a combined precipitation-dispersion strengthening is shown in the use of chromium as the added element for a copper based alloy. A quantity of chromium—about 1.5 percent by weight of a molten bath of copper—is dissolved in such bath. The chromium is then precipitated as chromium oxide in the melt by bubbling "wet" hydrogen through the molten copper-chromium alloy. The oxygen carried by the wet hydrogen reacts with the chromium to cause it to precipitate out as chromium oxide particles. By limiting the amount of gas being bubbled through the molten bath, a portion of the chromium is left in solution. Thus a duplex copper-chromium-chromium oxide alloy mixture is formed that will respond to a precipitation hardening treatment as well as being strengthened by dispersion.

As another example, a mixture consisting of copper-chromium in which the chromium is oxidized to chromium oxide using wet hydrogen as the bubbling gas is formed. After the completion of this reaction, silicon is then added in an amount of about 3 percent by weight of the molten mixture. Silicon nitride is then precipitated out of solution by bubbling nitrogen through the bath. The resulting precipitation-dispersion strengthened mixture would consist of copper-chromium oxide-silicon nitride.

From the foregoing description it will be apparent to those skilled in the art that this invention provides a new and improved method of preparing dispersion strengthened materials. Accordingly, it is contemplated that the scope

What is claimed is:

1. A method of dispersion strengthening of ductile materials selected from the group consisting of copper, gold, silver, platinum, palladium and alloys thereof which comprises: forming a melt of such material, adding up to about 10 percent by weight of such melt at least one element selected from the group consisting of chromium, titanium, thorium, uranium, boron, zirconium, silicon and alloys thereof which is soluble in such melt to form a solution of said element and said ductile material, said element being further characterized by being capable of forming a stable compound that is not soluble in said ductile material, bubbling a gas selected from the group consisting of nitrogen, hydrogen, ammonia, and mixtures thereof through such solution to form one of said compounds in solution with said ductile material so as to precipitate particles of said compounds throughout said melt, regulating the temperature of said melt and the velocity and volume of such gas to control the size of said particles throughout the melt, agitating said melt as such gas is bubbled through said melt in order to maintain a uniform distribution of said particles throughout said melt, and chill casting said melt with said uniformly distributed particles to form a dispersioned strengthened alloy of said ductile material and said compound of said element.

2. A method of dispersion strengthening of ductile materials selected from the group consisting of copper, gold, silver, platinum, palladium and alloys thereof which comprises forming a melt of such material, adding up to about 10 percent by weight of such melt at least one element selected from the group consisting of chromium, titanium, thorium, uranium, boron, zirconium, silicon and alloys thereof which is soluble in such melt to form a solution of said element and said ductile material, said element being further characterized by being insoluble in such melt upon the formation of at least one compound taken from the class consisting of a stable oxide, hydride and nitride of such elements, bubbling a gas selected from the group consisting of nitrogen, hydrogen, ammonia, and mixtures thereof through such solution to form one of said compounds so as to precipitate particles of said compound throughout said melt, regulating the temperature of said melt and the velocity and volume of such gas to control the size of said particles, agitating said melt as such gas is bubbled through said melt in order to maintain a uniform distribution of said particles throughout the melt, and chill casting said melt with said uniformly distributed particles to form a dispersioned strengthened alloy of said ductile material and said compound of said element.

3. A method of dispersion strengthening of ductile materials selected from the group consisting of copper, gold, silver, platinum, palladium and alloys thereof which comprises forming a melt of such material, adding up to about 10 percent by weight of such melt at least one element taken from the class consisting of chromium, titanium, thorium, uranium, boron, zirconium and silicon to form a solution of such material and said element, bubbling a gas taken from the class consisting of nitrogen, hydrogen, and ammonia through such solution to form a compound taken from the class consisting of oxides, hydrides and nitrides of such element and to precipitate particles of such compound throughout said melt, regulating the temperature of said melt and the volume and velocity of such gas so as to control the size of the precipitated particles, agitating said melt as said gas is bubbled through said melt so as to maintain a uniform distribution of said particles throughout said melt, and then chill casting said melt to form a dispersioned strengthened alloy of said ductile material and said compound.

4. A method of dispersion strengthening copper which comprises forming a melt of copper, adding up to about 10 percent by weight of the melt at least one element taken from the class consisting of chromium, titanium, thorium, uranium, boron, zirconium, and silicon to form a solution of copper and such element and such ductile material, bubbling a gas taken from the class consisting of nitrogen and hydrogen through such solution to form a compound taken from the class consisting of oxides, hydrides and nitrides of such element and to precipitate particles of such compound throughout said melt, regulating the temperature of said melt and the volume and velocity of such gas so as to control the size of the precipitated particles, agitating said melt as said gas is bubbled through said melt so as to maintain a uniform distribution of said particles throughout said melt, and then chill casting said melt to form an alloy of said copper and said compound of said element.

5. A method for dispersion strengthening of copper which comprises forming a melt of copper, adding titanium in an amount of about 3% by weight of the melt, bubbling nitrogen gas through said melt so as to react with said titanium in solution in said molten copper to form and precipitate out titanium nitride as discrete particles, regulating the temperature of said melt and the velocity and the volume of such gas to control the particle size of said particles through the melt, agitating said melt as said gas is bubbled through said melt in order to maintain a uniform distribution of such particles throughout the melt, and then chill casting said melt with said uniformly distributed particles to form a dispersion strengthened alloy of said copper and said titanium nitride.

6. A method for dispersion strengthening of copper which comprises forming a melt of copper, adding chromium in an amount of about 1.5 percent by weight of the melt, bubbling wet hydrogen gas through said melt to form precipitated particles of chromium oxide through said melt, regulating the temperature of said melt and the volume and velocity of such gas to control the particle size of such particles, agitating said melt as such gas is bubbled through said melt in order to maintain a uniform distribution of said particles throughout said melt, and chill casting said melt with said uniformly distributed particles to form a dispersion strengthened alloy of said copper and said chromium oxide.

7. A method for dispersion strengthening of copper which comprises forming a melt of copper, adding aluminum in an amount of about 5 percent by weight of the melt, bubbling a wet gas taken from the class consisting of hydrogen and nitrogen through said melt to form precipitated particles of aluminum oxide through said melt, regulating the temperature of said melt and the volume and velocity of such gas to control the particle size of such particles, agitating said melt as such gas is bubbled through said melt in order to maintain a uniform distribution of said particles throughout said melt, and chill casting said melt with said uniformly distributed particles to form a dispersion strengthened alloy of said copper and said aluminum oxide.

8. A method of precipitation-dispersion strengthening of ductile materials selected from the group consisting of copper, gold, silver, platinum, palladium and alloys thereof which comprises forming a melt of such material, adding up to about 10 percent by weight of such melt at least one element taken from the class consisting of chromium, titanium, thorium, uranium, zirconium and silicon to form a solution of such material and said element, bubbling a gas taken from the class consisting of nitrogen, hydrogen, and ammonia through such melt in sufficient amounts to precipitate particles of a compound taken from the class consisting of oxides, hydrides and nitrides of such element and so as to leave a portion of such element in solution with such molten ductile material, regulating the temperature of said melt and the volume and velocity of such gas so as to control the size of the said precipitated particles, agitating said melt as said gas is bubbled through said melt so as to maintain a uniform distribution of said particles throughout said melt, and then chill casting said melt to form a precipitation-dispersioned strengthened alloy of said ductile material, said element, and said compound of said element.

9. A method of precipitation-dispersion strengthennig of copper comprising forming a melt of copper adding chromium in an amount of about 1.5 percent by weight of the melt to said melt, bubbling a sufficient amount of wet hydrogen gas through said melt so as to form precipitated particles of chromium oxide and so as to leave a portion of such chromium in solution with said melt, regulating the temperature of said melt and the volume and velocity of such gas so as to control the size of the precipitated particles, agitating said melt as said gas is bubbled through said melt so as to maintain a uniform distribution of said particles throughout said melt, and then chill casting said melt to form a precipitation-dispersioned strengthened copper-chromium-chromium oxide alloy.

10. A method of precipitation-dispersioned strengthening of copper comprising forming a melt of copper, adding chromium in an amount of up to about 1.5 percent by weight of the melt, bubbling wet hydrogen gas through said melt to form a solution of copper-chromium oxide, adding silicon in an amount equal to about 3 percent by weight of the molten mixture, bubbling nitrogen gas through said solution so as to precipitate particles of silicon nitride throughout said solution, regulating the temperature and the volume and velocity of said nitrogen gas so as to control the size of said precipitated particles of silicon nitride, agitating said melt as said nitrogen gas is bubbled trrough said melt, and then chill casting said melt to form a precipitation-dispersion strengthened copper-chromium oxide-silicon nitride alloy.

References Cited

UNITED STATES PATENTS

| | | | |
|---|---|---|---|
| 2,311,750 | 2/1943 | Hensel et al. | 75—153 X |
| 2,793,949 | 5/1957 | Imich | 75—135 |
| 3,180,727 | 4/1965 | Alexander et al. | 75—134 |
| 3,189,444 | 6/1965 | Olds et al. | 75—148 |
| 3,205,099 | 9/1965 | Vordahl | 148—4 |
| 3,364,016 | 1/1968 | Mikawa | 75—159 |

L. DEWAYNE RUTLEDGE, Primary Examiner

G. K. WHITE, Assistant Examiner

U.S. Cl. X.R.

75—135, 153, 160, 164, 165, 172, 173